United States Patent
Cates et al.

(10) Patent No.: US 7,139,141 B1
(45) Date of Patent: Nov. 21, 2006

(54) SYSTEM AND METHOD FOR READ/WRITE OPTIMIZATION

(75) Inventors: James C. Cates, Superior, CO (US); Keith Gary Boyer, Broomfield, CO (US); Mark Hennecken, Parker, CO (US); Robert G. Brocko, Boulder, CO (US); Larry Blanchard, Longmont, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 40 days.

(21) Appl. No.: 10/436,682

(22) Filed: May 12, 2003

(51) Int. Cl.
*G11B 27/36* (2006.01)
*G11B 5/09* (2006.01)
(52) U.S. Cl. .......................... 360/31; 360/69; 711/111
(58) Field of Classification Search .................. 360/68, 360/31, 69; 711/111
See application file for complete search history.

(56) References Cited

U.S. PATENT DOCUMENTS

| | | | |
|---|---|---|---|
| 3,601,558 A * | 8/1971 | Sugaya et al. ................. 360/25 |
| 3,812,529 A * | 5/1974 | Yoichi .......................... 360/25 |
| 4,480,274 A * | 10/1984 | Coleman, Jr. ................. 360/31 |
| 4,928,287 A | 5/1990 | Tanaka |
| 5,077,623 A * | 12/1991 | McSweeney ................. 360/31 |
| 5,121,260 A | 6/1992 | Asakawa et al. |
| 5,206,738 A * | 4/1993 | Nishigaki et al. .............. 386/9 |
| 5,412,518 A | 5/1995 | Christner et al. |
| 5,608,584 A * | 3/1997 | Steinberg et al. ............. 360/69 |
| 5,790,334 A | 8/1998 | Cunningham |
| 5,819,309 A * | 10/1998 | Gray ........................... 711/111 |
| 5,850,316 A * | 12/1998 | Sato et al. .................... 360/93 |
| 6,256,158 B1 | 7/2001 | Brown et al. |
| 6,366,417 B1 | 4/2002 | Mathews et al. |
| 6,414,811 B1 | 7/2002 | Lee |
| 6,452,735 B1 | 9/2002 | Egan et al. |
| 6,476,725 B1 * | 11/2002 | Aguren et al. ........... 340/815.4 |
| 6,643,086 B1 * | 11/2003 | Hiramoto et al. ............. 360/69 |
| 6,775,087 B1 * | 8/2004 | Chan et al. ................. 360/74.1 |
| 2002/0105748 A1 | 8/2002 | Lamberts |
| 2004/0100714 A1 | 5/2004 | Berman et al. |

FOREIGN PATENT DOCUMENTS

JP   07161009   *  6/1995

OTHER PUBLICATIONS

Zhang Shuyu, et al., Variation Of The Heat Flux Between A Slider And Air Bearing When The Slider Files Over An Asperity, IEEE Transactions On Magnetics, Jul. 1998, pp. 1705-1707, vol. 34, No. 4.

Tian, Hong, et al., Non-Contact Induced Thermal Disturbance of MR Head Signals, IEEE Transactions On Magnetics, Sep. 1997, pp. 3130-3132, vol. 33, No. 5.

Dee, R.H., et al., Thermal Effects In Shielded MR Heads For Tape Applications, IEEE Transactions On Magnetics, Nov. 1991, pp. 4704-4706, vol. 27, No. 6.

(Continued)

*Primary Examiner*—Andrea Wellington
*Assistant Examiner*—Dan I Davidson
(74) *Attorney, Agent, or Firm*—Brooks Kushman P.C.

(57) ABSTRACT

In a tape drive for storing and retrieving information to and from a media, a system for optimizing write performance includes a tape head and a controller. The tape head may include a write element. The controller may be for optimizing write performance in response to at least one media information signal that is stored on a media cartridge.

18 Claims, 5 Drawing Sheets

OTHER PUBLICATIONS

Application with 1 drawing sheet as filed in U.S. Appl. No. 10/208,406, filed Jul. 30, 2002.

Application with 3 drawing sheets as filed in U.S. Appl. No. 10/266,048, filed Oct. 7, 2002.

* cited by examiner

SYSTEM AND METHOD FOR READ/WRITE OPTIMIZATION

BACKGROUND OF THE INVENTION

1. Field of the Invention

The present invention relates to a system and a method for tape data storage system read/write optimization.

2. Background Art

Competition from various alternative data storage technologies (e.g., magnetic disk, optical disk, etc.) has pushed magnetic tape data storage technology to achieve increasingly higher cartridge data capacities and transfer rates. In order to reach these increasingly higher levels of performance, the technologies employed in tape drives and tape cartridges have grown more complex. Tape drive and tape cartridge operating points have become more aggressive and utilize higher track and linear recording densities, thinner media, etc.

Tape system error rate performances for "read" and "write" operations are a measure of overall drive operational health and as such are affected by virtually all aspects of the system. Tape system error rate performances affect the design choices of drive and media operating points, as well as drive set up and adjustment in manufacturing. Furthermore, error rate is affected by subsequent maintenance issues such as mechanical alignment stability, wear, the affect of accumulated tape media debris within the tape path and operational environmental conditions.

Increasing error rate leads to an increasing number of operational retries. Delays associated with the retries impact overall data handling throughput of the drive and the associated system. An elevated error rate may cause the drive to skip sections of media resulting in decreased storage capacity. Further error rate increases can prevent the drive from processing any data. As the choice of drive operating point utilizes increasingly higher data densities (i.e., track densities and linear densities) the sensitivity of the error rate to all the above listed characteristics typically increases. Other removable storage media (e.g., magnetic disks, optical disks, etc.) can experience similar system performance issues.

Many of the design points of the drive and manufacturing adjustments to the drive are fixed and as such represent a compromise for satisfactory operations (and the associated error rates) over some nominal range of conditions. A tape drive system having changeable design points and adjustments may better optimize a particular operational condition or circumstance the drive was experiencing and provide an opportunity for lower error rates and an accompanying improvement in system performance.

Thus there exists an opportunity and need for an improved tape drive system and method that provides periodic, dynamic adjustment of drive parameters to capitalize upon system operations optimized for drive and for media conditions.

SUMMARY OF THE INVENTION

The present invention generally provides new, improved and innovative techniques to optimize media (e.g., tape) read and write operations and, thereby, reduce error rates, and improve tape drive system margin and performance. The present invention generally provides a system and a method for an improved tape data storage system that can continually (e.g., dynamically) optimize read and write operations to decrease error rate and improve performance. Such an improvement may implement a number of processes in connection with respective systems to determine an optimal set of performance settings that minimize error rates. The optimization can be configured to adjust parameters such as read bias current, channel equalization settings, filter parameters, system transfer functions, and write current, signal timing, pulse widths, etc. Such techniques can reduce tape system storage costs, improve reliability and permit higher media cartridge capacities and data transfer rates.

According to the present invention, in a tape drive for storing and retrieving information to and from a media, a system for optimizing write performance is provided comprising a tape head and a controller. The tape head comprising a write element. The controller may be for optimizing write performance in response to at least one media information signal that is stored on a media cartridge.

Also according to the present invention, in a tape drive for storing and retrieving information to and from a media, a system for optimizing read performance is provided comprising a tape head and a controller. The tape head comprising a read element. The controller may be for optimizing read performance in response to at least one media information signal that is stored on a media cartridge.

Further, according to the present invention, in a tape drive system for storing and retrieving information to and from a cartridge having a media, a method for optimizing write performance and read performance to and from the media is provided. The method comprising reading at least one media information signal from the cartridge, and adjusting at least one system parameter corresponding to the media information signal.

Yet further, according to the present invention, in a storage system for storing and retrieving information to and from a media in a media cartridge, a method for optimizing write performance and read performance to and from the media is provided. The method comprising reading at least one media information signal from the cartridge, and adjusting at least one system parameter corresponding to the media information signal.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved tape data storage system that can continually (e.g., dynamically) optimize read and write operations to decrease error rate and improve performance. Such an improvement generally implements a number of processes to determine an optimal set of performance settings that generally minimize read and write error rates. In one example, the optimization can be configured to adjust parameters that correspond to a read operation such as read bias current level (or amplitude), channel equalization settings, filter parameters, system transfer functions, etc. In another example, the optimization can be configured to adjust parameters that correspond to a write operation such as write current level (or amplitude), signal timing, pulse widths, etc. In yet another example, both read operation parameters and write operation parameters may be optimized to provide an overall system optimization.

Figure 1A:
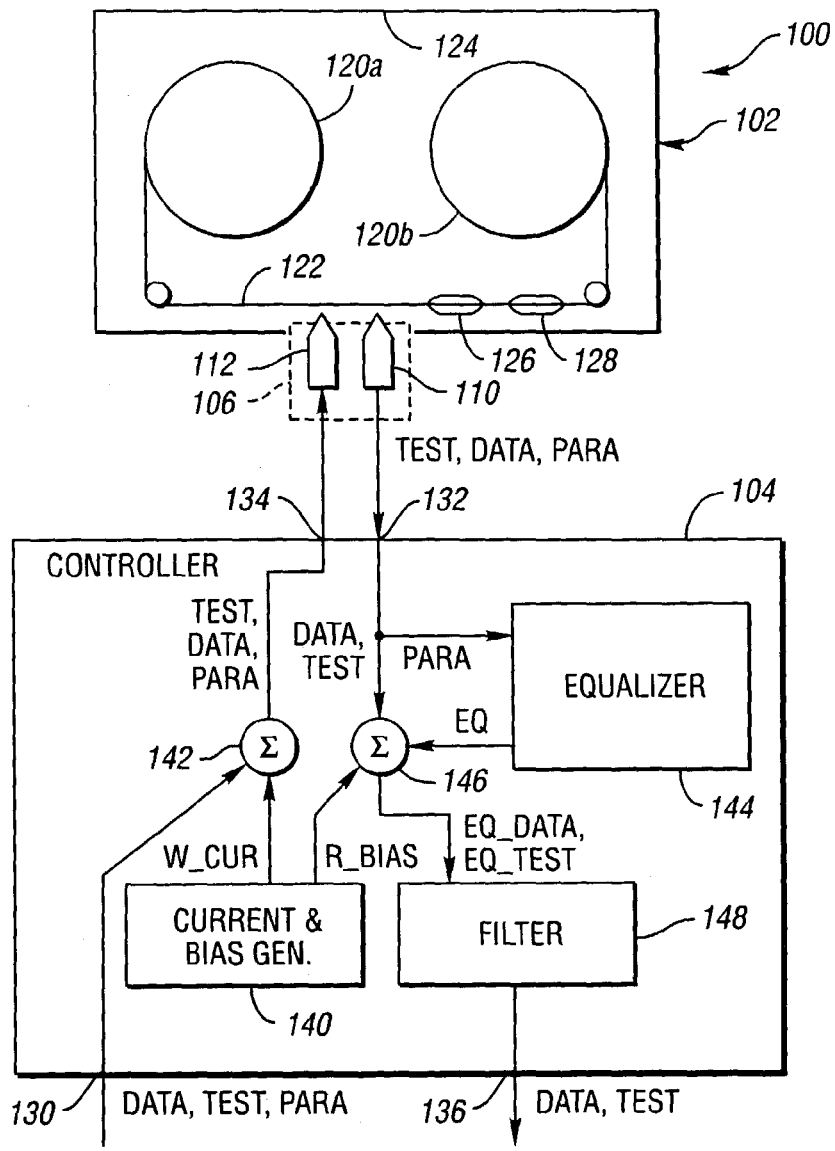
FIGS. 1(a–b) are diagrams of a tape drive system according to a preferred embodiment of the present invention.

Referring to FIGS. 1(a–b), diagrams illustrating a tape drive system 100 in accordance with a preferred embodiment of the present invention are shown. The tape drive 100 may be implemented as a cartridge (or cassette) tape drive apparatus. The system 100 is generally configured for storing and retrieving information (or data) to and from a media. The tape drive system 100 generally comprises a media (or tape) cartridge (or cassette) 102, a controller 104, and transducer (e.g., a tape head) 106. The cartridge 102 is generally a backup or archive media cartridge. The controller 104 (which may take the form of a control circuit) may be implemented to control a number of operations (i.e., methods, steps, processes, routines, etc.) related to read and write. The controller 104 may also be configured to provide biasing to at least one signal that is written to media in the cartridge 102, and biasing and equalization (or transfer function adjustment) to at least one signal that is read from the tape cartridge 102. The head 106 generally comprises at least one media read element (or transducer) 110 and at least one media write element (or transducer) 112.

Figure 1B:
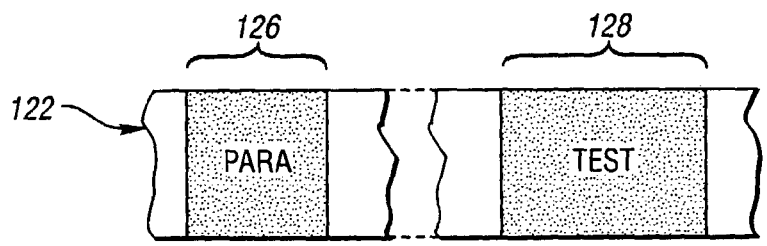

In one example, the media cartridge 102 generally comprises two spools (or reels) 120a and 120b and a media (e.g., a tape media) 122 wound on the reels 120 inside a housing 124. The spools 120a and 120b generally transport the media 122. The cartridge 102 is generally positioned (or disposed) such that a number of the tape operations (e.g., write/read, legacy read only, testing, etc.) may be performed on the media 122 via the head 106 as controlled by the controller 104. As illustrated in FIG. 1b, a media information record (or region) (MIR) 126 is generally recorded in a pattern (or area) on the media 122. In one example, a test data pattern 128 may also be recorded on the media 122.

The data (or information) saved (i.e., recorded, stored, written, etc.) in the media MIR pattern 126 generally comprises at least one signal (e.g., PARA) having a value or data that is related to specific information about the recording characteristics of the media 122 sample. The signal PARA is generally stored (or recorded) on (or resides in) the cartridge 102. The information PARA is generally written to the MIR 126 when the media 122 is tested during manufacture of the cassette 102. For example, information that corresponds to the media 122 nominal coercivity may be recorded in the MIR 126. The system 100 may read the nominal coercivity information (e.g., the signal PARA) and adjust the system 100 write current for optimal operation in response to the signal PARA. Since recording on media 122 is not required in the case of at least one mode of a write current optimization process, a channel associated with the media 122 may be ready to be read before the drive where the system 100 is implemented has reached a first data block on the media 122.

Other parameters, in addition to coercivity, related to the media 122 or the system 100 such as recording characteristics corresponding to a respective data or servo channel such as PW50 (i.e., the width of a playback pulse having an amplitude that is 50% of peak playback amplitude), nominal data signal amplitude, at least one frequency rolloff characteristic, total error counts, mechanical dimensions (e.g., magnetic coating thickness), etc. may also be recorded (i.e., stored, saved, held, etc.) as the signal PARA.

In other examples, parameters related to the system 100 or the media 122 that may be recorded as the signal PARA comprise cartridge or tape format, modulation code that is implemented for the recording and playback, and recording density. In yet other examples, parameters related to the system 100 or the media 122 that may be recorded as the signal PARA comprise read/write error rates, error maps, date of manufacture, manufacturing lot numbers, etc. The information PARA may be related to all of the media 122 in a particular manufactured lot. The signal PARA may also vary between particular media samples in a given lot. However, the value (or signal) PARA may be implemented as any appropriate signal or number of signals to meet the design criteria of a particular application.

When the test pattern 128 is used, the data written to the test pattern 128 generally comprises at least one predetermined set of data (e.g., a previously specified or predefined block or blocks of digital signals, TEST) that tests or exercises the read/write capabilities of the system 100. In one example, the signal pattern TEST may comprise a random digital pattern (i.e., random 1's and 0's). In another example, the pattern TEST may comprise a long string of alternating 1's and 0's. In yet another example, the pattern TEST may comprise a long string of 1's followed by a long string of 0's. The pattern TEST may comprise any combination of random 1's and O's, alternating 1's and 0's, strings of 1's followed by strings of 0's, or any appropriate pattern to meet the design criteria of a particular application.

The controller 104 may have an input 130 that may receive the media information PARA, the test data TEST, and a normal mode of operation (e.g., archival, storing, etc.) signal (e.g., DATA) during at least one store process. The signal DATA is generally the information stored and retrieved from the cartridge 102 via the system 100. The controller 104 may have input 132 that may receive the signals PARA, TEST, and DATA from the media 122 via the read transducer (or element) 110 during playback processes. The controller 104 may have output 134 that may present the signals PARA, DATA and TEST to the write transducer (or element) 112 for recording on the media 122 during at least one record process and an output 136 that may present the signals DATA and TEST during at least one playback process.

The signals DATA, TEST and PARA that are presented to the input 130 are generally in an unbiased, unequalized and unfiltered (i.e. unmodified) form. The controller 104 generally biases or shifts the level, timing, pulse width, front and/or back edge location, edge slope, edge shape, etc. of the signals DATA, TEST and PARA before presenting them to the write element 112 from the output 134. The signals DATA, TEST and PARA that are presented by the read element 110 to the input 132 of the controller 104 are generally unequalized and unfiltered. The controller 104 generally equalizes and filters the signals DATA and TEST before presenting them via the output 136.

The controller 104 generally comprises a bias and current generator 140, convolvers 142 and 146, an equalizer 144 and a filter 148. The convolvers 142 and 146 may take the form of summation circuits. The generator 140 may be configured to generate a write current (e.g., W_CUR) and a read bias current (e.g., R_BIAS). The generator 140 may present the signals W_CUR and R_BIAS to the convolvers 142 and 146, respectively. The controller 104 may present the signals DATA, TEST and PARA in the biased or shifted form to the write element 112.

The convolver 142 may be configured to receive and combine at least one of the signals, DATA, TEST and PARA with the write current signal W_CUR to generate the respective signals DATA, TEST, and PARA that are presented to the write element 112. The write current W_CUR generally biases the level at which the respective one of the signals DATA, TEST, and PARA is recorded.

The equalizer 144 may be implemented as an equalization generation circuit. The equalizer 144 may have an input that may receive the signal PARA and an output that may present a signal (e.g., EQ). The signal EQ may be implemented as a signal equalization. The equalization EQ is generally configured to provide signal equalization to the signals DATA and TEST that are read from the media 122. The equalization EQ is generally implemented supplemental to any pre-emphasis and/or de-emphasis processes that the controller 104 may perform.

The equalizer 144 may be configured to generate and/or adjust the signal (or equalization) EQ in response to the signal PARA. In one example, the equalizer 144 may be configured to determine the equalization EQ via a lookup table (LUT, not shown). In another example, the equalizer 144 may be configured to determine (or calculate) the equalization EQ in response to at least one equation (or routine). The routine configured to calculate (or adjust) the equalization EQ may be implemented in software, firmware, hardware, or any appropriate combination thereof.

The convolver 146 may be configured to receive and combine the signal DATA (or alternatively, the signal TEST) as read from the media 122, the signal R_BIAS, and the equalization EQ to generate equalized signals (e.g., EQ_DATA and EQ_TEST). During media read (or reproduction) operations such as write/read or read only processes, the controller 104 generally applies the read bias R_BIAS and the equalization EQ to the signals DATA and TEST.

The signal equalization EQ is generally configured to compensate for (i.e., adjust for, modify in response to, etc.) at least one generally linear or non-linear effect (e.g., an amount of coercivity, at least one frequency rolloff characteristic, a magnetic coating thickness, etc.) related to the media 122 or media related processes performed by the system 100 as provided in the at least one media information signal (or statistic) PARA. The signals EQ_DATA and EQ_TEST may be presented to the filter 148. The filter 148 may be configured to provide filtering to the signals EQ_DATA and EQ_TEST that are presented at the output 136. The signals DATA and TEST that are presented at the output 136 generally replicate (i.e., are similar to) the signals DATA and TEST that are received at the input 130.

An error count for the signals TEST and DATA generally establishes the acceptability of the signals DATA and TEST that are played back from the media 122. The environment where the tape drive system 100 is implemented generally monitors (i.e., measures, determines, etc.) the error count corresponding to the system 100. As discussed in more detail in connection with FIGS. 5 and 6, the system 100 may adjust (i.e., modify, set, etc.) parameters related to read and to write operations to optimize (e.g., minimize) the total error count of the system 100.

The controller 104 is generally configured to adjust a number of parameters to optimize at least one write process (e.g., to minimize the error count) of the system 100. The parameters associated with the write operation that may be varied (i.e., changed, adjusted, modified, etc.) by the system 100 include but are not limited to the write current W_CUR amplitude (or level), timing of the signals DATA and TEST, width of pulses corresponding to the signals DATA and TEST, and at least one transfer function related to read/write channel equalization (e.g., a filter 148 transfer function, a transfer function related to the controller 104, etc.).

The controller 104 is also generally configured to adjust parameters to optimize at least one read process (and minimize the error count) of the system 100. The parameters that are varied to optimize the system 100 error count related to read operations may include the read bias current R_BIAS amplitude (or level), the equalization EQ, and parameters related to the filtering performed by the filter 148.

Figure 2:
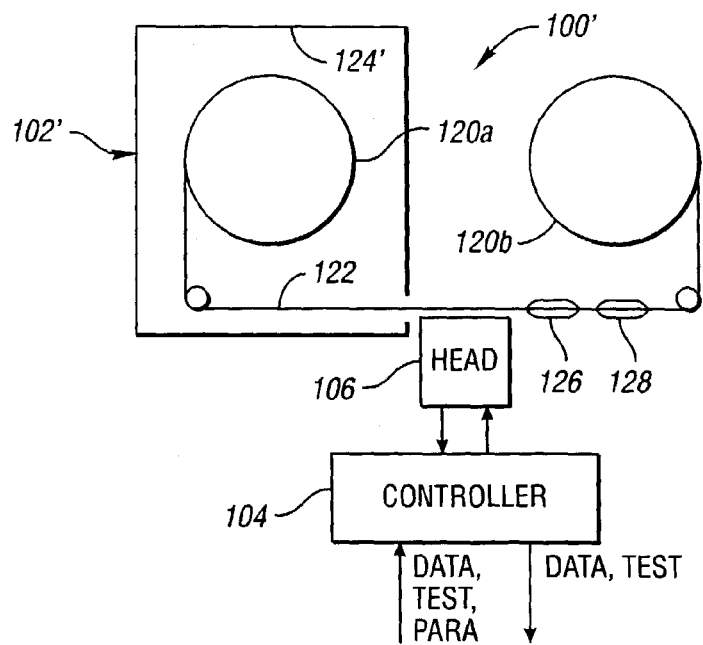
FIG. 2 is a diagram of a tape drive system according to an alternative embodiment of the present invention.

Referring to FIG. 2, a diagram of a system 100' illustrating an alternative embodiment of the present invention is shown. The system 100' is generally implemented similarly to the system 100. The system 100' generally comprises a media cartridge 102'. The cartridge 102' may be implemented as a single reel (or spool) cartridge. The cartridge 102' generally comprises the reel 120a and a housing 124'. The second reel (e.g., the reel 120b) is generally implemented as a take-up reel in connection with the system 100' tape drive apparatus.

Figure 3A:
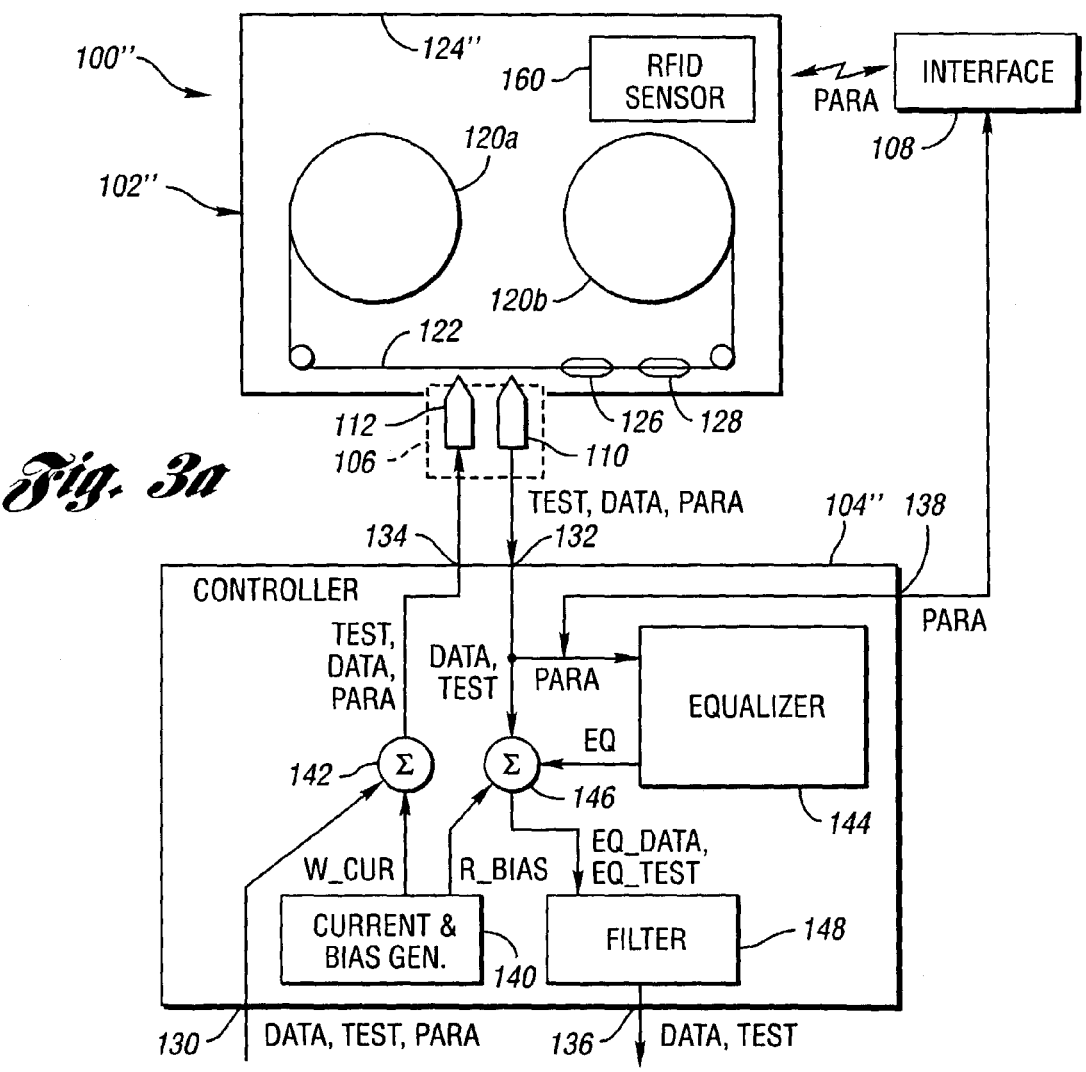
FIGS. 3(a–b) are diagrams of a tape drive system according to another alternative embodiment of the present invention.

Referring to FIGS. 3(*a–b*), diagrams of a system 100" illustrating an alternative embodiment of the present invention are shown. The tape drive system 100" generally comprises a media cartridge (or cassette) 102", a controller 104", the head 106, an interface 108, and a housing 124". The tape system 100" may be implemented similarly to the system 100.

Figure 3B:
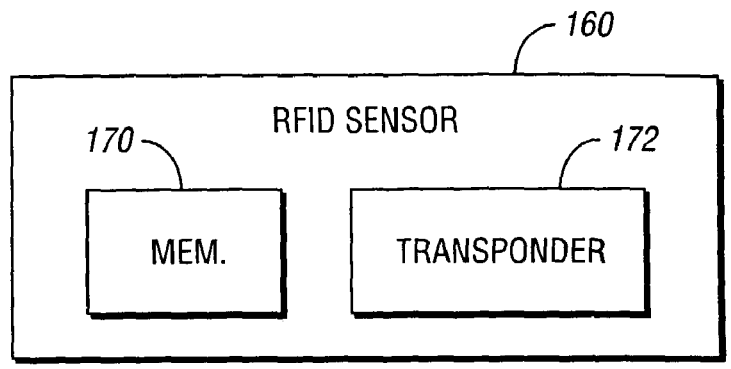

The media cartridge 102" generally comprises a radio frequency cartridge identification (RFID) sensor (or transducer) 160 mounted in the housing 124". As illustrated in FIG. 3b, the sensor 160 generally comprises a nonvolatile memory circuit 170 and an RF communication circuit 172 (e.g., a transponder, transducer, etc.). The sensor 160 may be configured to store data (or information) similarly to the MIR pattern 126 on the media 122. The data saved (i.e., recorded, stored, written, etc.) in the sensor 160 (e.g., in the memory 170 generally comprises the at least one value (i.e., the signal PARA) that corresponds to the cartridge 102".

The controller 104" may have an input/output 138 that may receive/present the at least one value PARA to and from the interface circuit 108. The interface 108 may be implemented as a radio frequency (RF) interface. The interface 108 may be configured to provide RF communication comprising the value PARA between (i.e., to and from) the cartridge 102" (i.e., the RFID sensor 160 via the transponder 172) and the controller 104". Thus, data (or information) contained in the MIR 126 on the media 122 (e.g., the value PARA) may also (or alternatively) be recorded in and/or played back from the sensor 160 via the interface 108.

Figure 4:
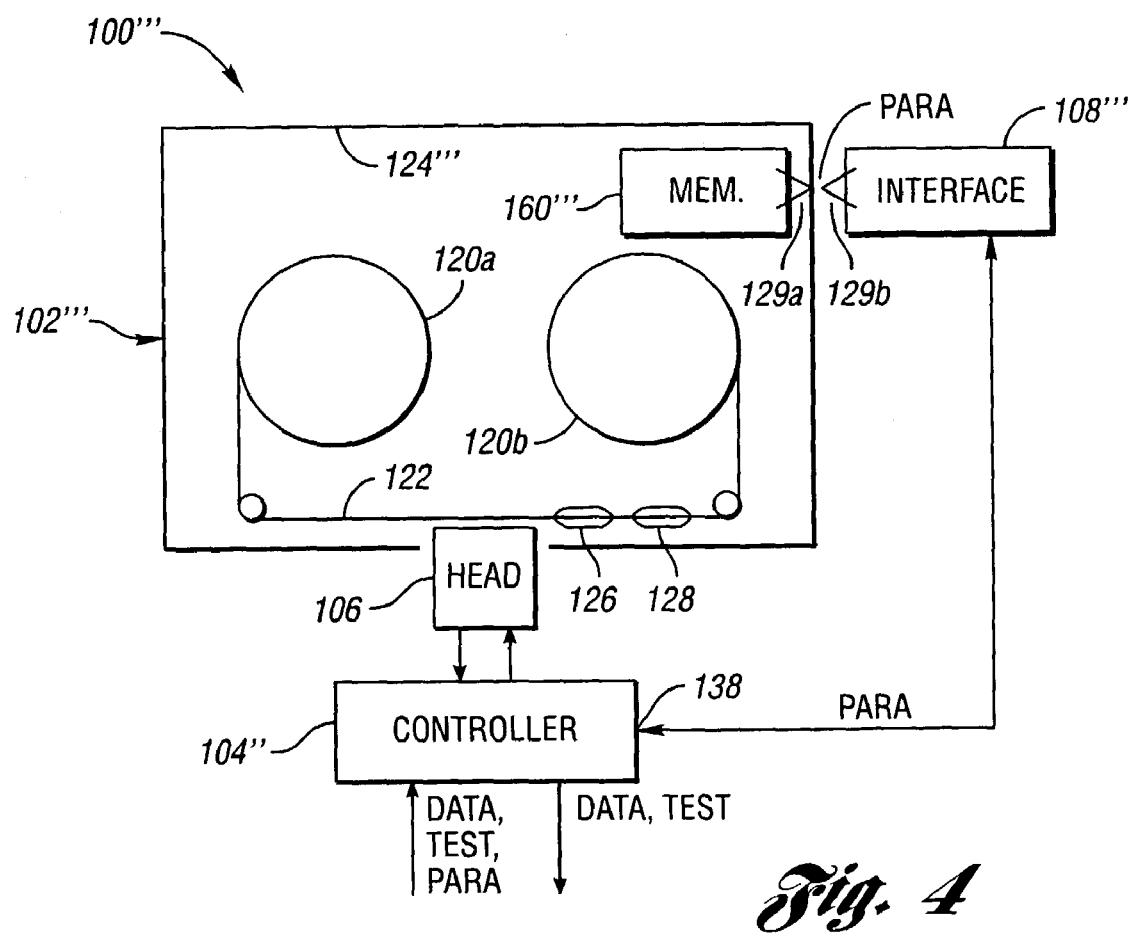
FIG. 4 is a diagram of a tape drive system according to another alternative embodiment of the present invention.

Referring to FIG. 4, a diagram of a system 100''' illustrating another alternative embodiment of the present invention is shown. The tape drive system 100''' generally comprises a media cartridge 102''', the controller 104", the head 106, and an interface 108'''. The system 100''' may be implemented similarly to the systems 100, 100' and 100".

The cartridge 102''' generally comprises a non-volatile memory 160''' mounted in a housing 124'''. The memory 160''' generally comprises a plurality of electrical contacts 129a. The interface 108''' generally comprises a plurality of electrical contacts 129b. When the cartridge 102''' is mounted in the tape drive system 100''', the contacts 129a and 129b are generally configured as a transducer to provide electrical communication between the interface 108''' and the memory 160'''. The at least one value PARA is generally presented and received to and from the cartridge 102''' (i.e., the memory 160''') and the controller 104'' via the connection formed by an intersection of the contacts 129a and 129b.

In one example, the contacts 129a and/or 129b may be implemented as finger contacts. In another example, the contacts 129a and/or 129b may be implemented as spring-loaded button contacts. However, the contacts 129a and 129b may be implemented as any appropriate contacts configured as a transducer to meet the design criteria of a particular application. The contacts 129a may be implemented having a similar or a different configuration than the contacts 129b.

An implementation such as the tape drive system 100'' and/or the system 100''' may provide a user with tape cartridge flexibility. The user may implement a tape cartridge such as the cartridge 102 or 102' having an MIR 126 on the media 122 and/or cartridges such as the cartridge 102'' and/or the cartridge 102''' having an MIR 126 on the media 122 and an RFID sensor 160 and/or a memory 160''', respectively. Such flexibility may provide systems advantages (e.g., future upgrade compatibility, reduced tape cartridge inventory, etc.). Alternative versions (not shown) of the single spool cartridge 102' may be implemented having an RFID 160 or a memory 160''' similarly to the cartridges 102'' and 102''', respectively.

Since the at least one tape media cartridge 102 values PARA are generally stored (or recorded) on (or reside in) and read from the cartridge 102 having at least one of the media 122 MIR pattern 126, the sensor 160, and the memory 160''' via a respective transducer (e.g., the head 106, the interface 108, etc.) prior to other tape operations, any given channel operating on the media 122 is generally ready to have a tape operation performed (i.e., the equalization EQ corresponding to the channel may be determined, filter 148 parameters may be adjusted, etc.) via the system 100 prior to encountering a data signal (e.g., the signal DATA) on the media 122. As a result, the system 100 may have an overall throughput rate that is more rapid than a conventional tape drive system.

Figure 5:
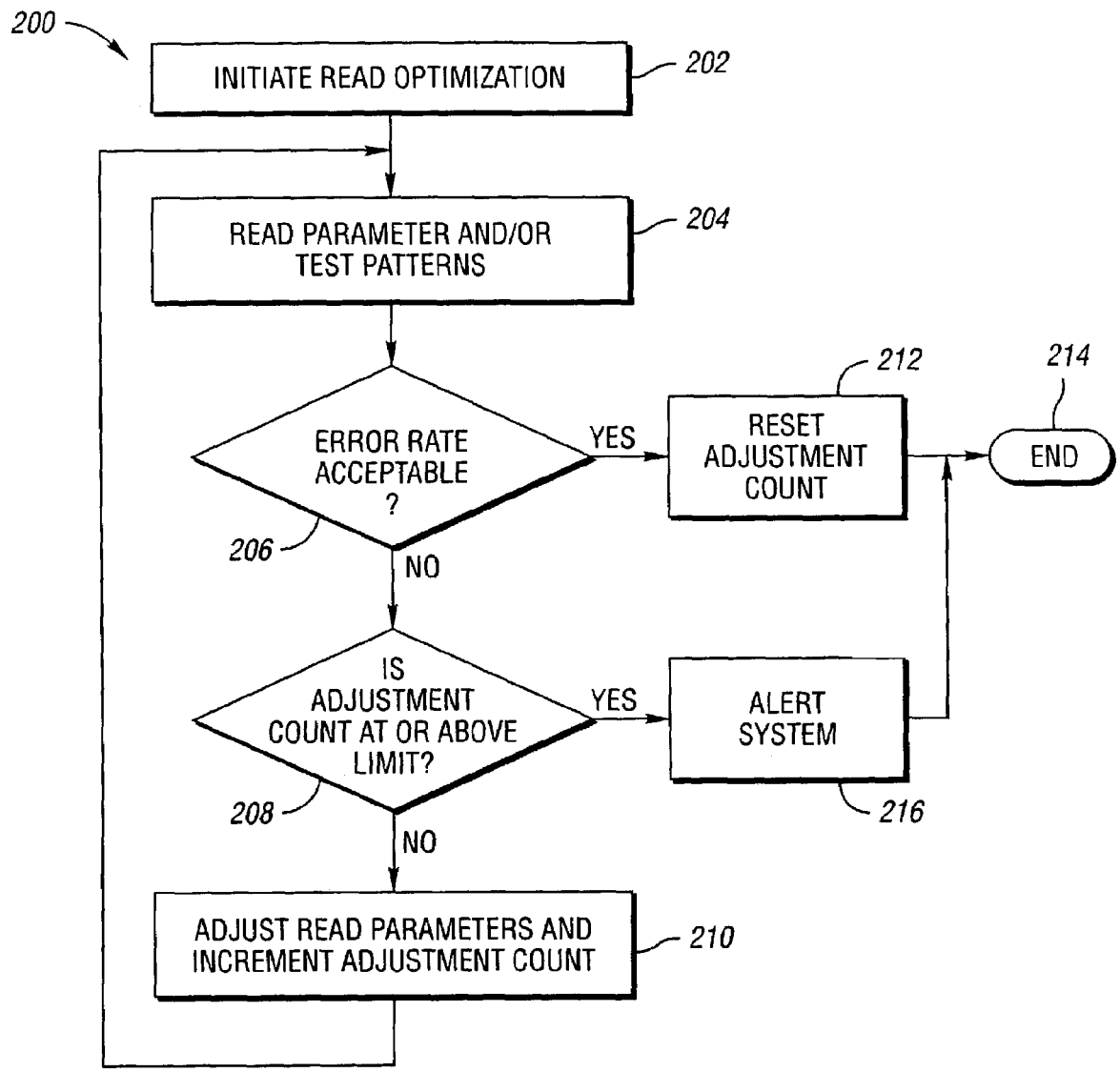
FIG. 5 is a flow diagram of an operation of the present invention.

Referring to FIG. 5, a flow diagram 200 illustrating an operation (i.e., method, process, routine, procedure, steps, etc.) in accordance with the present invention is shown. The process 200 may be implemented in connection with a tape drive system such as the systems 100, 100', 100'' and 100'''. The procedure 200 generally is related to at least one read operation.

Any of a number of actions or occurrences may be implemented to trigger the system 100 to initiate the read procedure optimization (block 202). In one example, the system 100 may optimize at least one read procedure each time the drive where the system 100 is implemented is powered up or each time a cartridge 102 is inserted into the drive. In an extreme case the drive implemented in connection with the system 100 may be configured to optimize at each new data block on the media 122.

In another example, poor error rates (i.e., an unacceptable error count) or particular values of the signal PARA may trigger a system 100 optimization process such as the method 200. The unacceptable error count rates may be predetermined absolute values or relative values. In yet another example, the system 100 may initiate the process 200 in response to a change in the cartridge 102 or the media 122 physical element, a change in modulation code that is implemented to store information on the media 122, and recording density of the information stored on the media 122. In a further examples, the system 100 may initiate the process 200 at periodic time intervals, random time intervals, or a combination of periodic and random time intervals. However, the system 100 may initiate the routine 200 in response to any appropriate stimulus to meet the design criteria of a particular application.

When the cartridge 102 is loaded into the drive where the system 100 is implemented, the MIR 126, the RFID 160, or the memory 160''' (i.e., the at least one value PARA that is recorded on or resides in the cartridge 102) or alternatively, the data TEST that is stored at the media region 128 is read (block 204) prior to reading and writing on the media 122.

When the read performance is poor (i.e., the error count is not acceptable, the NO leg of decision block 206), the system 100 generally determines how many times the read parameters have been adjusted during the current operation 200 (i.e., decision block 208). A value (e.g., COUNT) may be implemented to track the number of times the read parameters are adjusted. When the adjustment count (i.e., the value COUNT) is at or above a predetermined limit (i.e., the YES leg of the decision block 208), the method 200 generally presents (e.g., generates, sends, etc.) an alert to the system 100 (block 216) and the process 200 is completed (block 214). When the system 100 receives the alert that the limit for the value COUNT was met or exceeded, the system 100 is generally configured to implement steps (e.g., user notification, system interruption, etc.) that are appropriate to meet the design criteria of a particular application.

Returning to the decision block 208, when the operation 200 determines that the adjustment count value (i.e., the signal COUNT) is below the limit (i.e., the NO leg of the decision block 208), the system 100 generally adjusts one or more read parameters to optimize the read settings (block 210). For example, the system 100 drive may read a data pattern (e.g., read the pattern TEST during the block 204) and vary read related parameters (block 210) until the error rate is optimized. Parameters that can be varied (or adjusted) to optimize the read performance include at least one of the read bias current R_BIAS, channel equalization settings EQ, at least one of the filter 148 parameters, etc. The process 200 generally returns to the block 204 until the error rate (i.e., the error count) is acceptable (i.e., the YES leg of the decision block 206), the value COUNT is reset (block 212), and the read optimization process 200 is completed (block 214).

Figure 6:
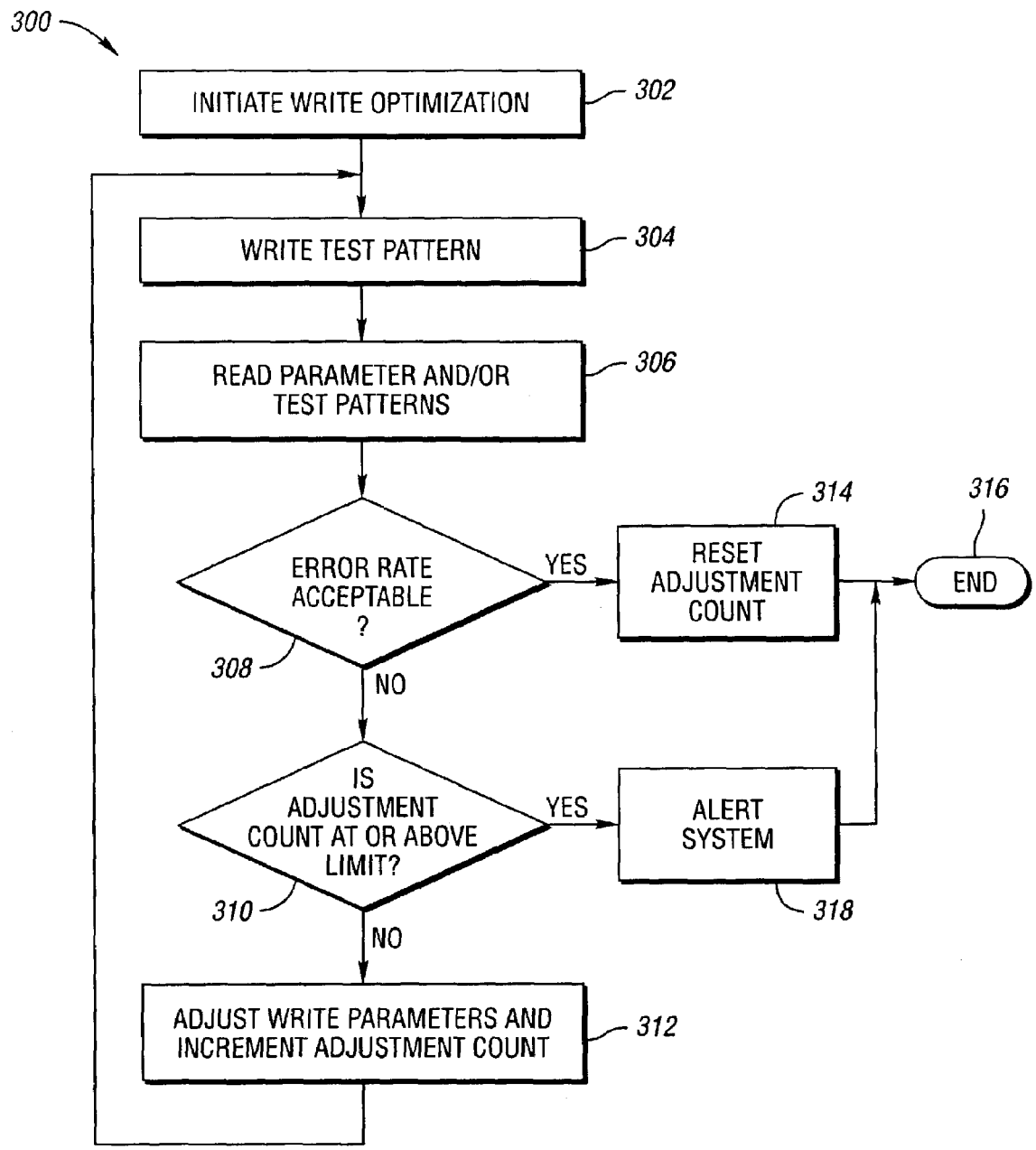
FIG. 6 is a flow diagram of an alternative operation of the present invention.

Referring to FIG. 6, a flow diagram 300 illustrating another operation (i.e., method, process, routine, procedure, steps, etc.) in accordance with the present invention is shown. The process 300 may be implemented in connection with a tape drive system such as the systems 100, 100', 100'' and 100'''. The procedure 300 generally is related to at least one write operation optimization.

In one example, the system 100 may initiate the write procedure optimization (block 302) in connection with the read optimization process 200. However, the system 100 may initiate the write optimization 300 in connection with any appropriate trigger (e.g., each time the drive where the system 100 is implemented is powered up, each time a cartridge 102 is inserted into the drive, at each new data block on the media 122, when poor error rates (i.e., unacceptable error counts) are detected, when at least one particular value of the signal PARA is read, etc.

When the cartridge 102 is loaded into the drive where the system 100 is implemented, the data TEST is stored (e.g., written) (block 304) at the region 128 on the media 122. The data TEST that is stored at the media region 128 is read (block 306) from the media 122.

When the write/read performance is poor (i.e., the error count is not acceptable, the NO leg of decision block 308), the system 100 generally determines how many times the write parameters have been adjusted during the current operation 300 (i.e., decision block 310). When the "adjust count" (i.e., the value COUNT) is at or above a predetermined limit (i.e., the YES leg of the decision block 310), the method 300 generally presents (e.g., generates, sends, etc.) an alert to the system 100 (block 318) and the process 300 is completed (block 316). When the system 100 receives the alert that the limit for the value COUNT was met or exceeded, the system 100 is generally configured to implement steps that are appropriate to meet the design criteria of a particular application similar to the alert system block 216 of the operation 200.

Returning to the decision block 310, when the operation 300 determines that the adjustment count value (i.e., the signal COUNT) is below the limit (i.e., the NO leg of the decision block 310), The system 100 generally adjusts one or more write parameters to optimize at least one write performance (e.g., minimize the error count). For example, the system 100 drive can read a data pattern (e.g., the pattern TEST) (block 306) and vary (or adjust) at least one write parameter (block 312) until the error rate error count is optimized. Parameters related to the signals written to the media 122 (e.g., the signals DATA, TEST and PARA) that can be varied include the write current W_CUR amplitude (or level), signal (e.g., the signals DATA, TEST and PARA) timing, pulse widths, etc. The process 300 generally returns to the block 304 until the error rate (i.e., the error count) is acceptable (i.e., the YES leg of the decision block 308), the value COUNT is reset (block 314), and the write optimization process 300 is completed (block 316).

In some cases a user may want to optimize both the read and write settings. The procedure 200 and the procedure 300 may both be performed and the system 100 will generally be optimized for both the read and write operations.

Each cartridge 102 may contain a media parameter (e.g., the signal PARA at the region 126) and/or a data pattern (e.g., the pattern TEST at the region 128) at the beginning of the tape. The system 100 may use the value PARA or the pattern TEST to optimize read performance. The cartridge 102 may also have an area (e.g., the region 128) where the write process may write data patterns (e.g., the pattern TEST) and optimize read and write settings.

The read and write optimization setting information (or data) may be recorded at the factory where the cartridges 102 are manufactured. Each cartridge 102 may be initialized in a special drive or test platform and the procedures 200 and 300 may be performed. Once the system 100 has been optimized, the optimal parameters could be stored as the values PARA in the MIR 126, the RFID 160, or the memory 160''' as at least one step of the cartridge 102 unloading process. The at least one optimized setting PARA would be available when the cartridge 102 is written to or read from at another time.

In one example, when the processes 200 and 300 are completed, the system 100 may store the parameters that generated the optimum read (and write) performance (e.g., update the signal PARA for use in subsequent operations in the same or a different drive). The next implementation of the processes 200 or 300 (e.g., subsequent operations) may be initiated by implementing the stored parameters (i.e., the starting point 202 or 302, respectively, may be implemented using the updated signal PARA). In another example, the default starting parameters may be nominal values. However, the starting parameters may be implemented as any appropriate values to meet the design criteria of a particular application.

As is readily apparent from the foregoing description, then, the present invention generally provides an improved system (e.g., the system 100) and an improved method (e.g., the processes 200 and 300) for media read/write optimization. The system 100 and the procedures 200 and 300 may provide a system and a method for an improved tape data storage system that can continually (e.g., dynamically) optimize read and write operations to decrease error rate and improve performance. While generally described in connection with a tape drive system, the present invention may be implemented in connection with any appropriate removable storage media (or media cartridge) (e.g., magnetic disk, optical disk, etc.) to meet the design criteria of a particular application.

An example of an apparatus and/or method to reduce bias current for a MR reader during a read only operation may be found in U.S. application Ser. No. 10/208,406 filed Jul. 30, 2002, now issued as U.S. Pat. No. 6,764,006, and an example of a system and method for read/write channel optimization based on media usage statistics may be found in U.S. application Ser. No. 10/266,048 filed Oct. 7, 2002, now abandoned, both of which are incorporated by reference in their entirety.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a tape drive for storing and retrieving information to and from a media, a system for optimizing write performance comprising:

a tape head comprising a write element; and a controller for optimizing write performance in response to at least one media information signal that is stored on a media cartridge;

wherein the media is provided as part of the media cartridge;

wherein the media information signal corresponds to at least one of media nominal coercivity recorded during manufacture, read/write error rate, error maps, magnetic coating thickness, PW50 recording characteristics, nominal data signal amplitude, total error counts, cartridge format, tape format, modulation code that is implemented for the recording and playback, recording density, and at least one frequency rolloff characteristic;

wherein the at least one media information signal is stored in at least one of a radio frequency identification (RFID) sensor in the cartridge, and a memory in the cartridge through electrical contacts.

2. The system of claim 1 wherein the media information signal further corresponds to at least one of date of manufacture, and manufacturing lot numbers.

3. The system of claim 1 wherein optimizing write performance comprises at least one of adjusting signal timing, adjusting a signal pulse width, and adjusting a write current signal amplitude of signals written to the media.

4. The system of claim 1 wherein the tape head further comprises a read element and the controller is further configured for optimizing system read performance in response to an error correction count exceeding a predetermined value.

5. The system of claim 4 wherein the controller comprises a filter and a bias current generator, and optimizing read performance comprises adjusting at least one filter parameter and adjusting a read bias current.

6. The system of claim 1 wherein the at least one media information signal is stored on the media to be written to by the write element of the tape head.

7. In a tape drive for storing and retrieving information to and from a media, a system for optimizing read performance comprising:
   a tape head comprising a read element; and
   a controller for optimizing read performance in response to at least one media information signal that is stored on a media cartridge, wherein the media information signal corresponds to at least one of media nominal coercivity recorded during manufacture, read/write error rate, error maps, magnetic coating thickness, PW50 recording characteristics, nominal data signal amplitude, total error counts, cartridge format, tape format, modulation code that is implemented for the recording and playback, recording density, and at least one frequency rolloff characteristic, and wherein the media information signal further corresponds to at least one of date of manufacture and manufacturing lot numbers.

8. The system of claim 7 wherein optimizing read performance comprises at least one of adjusting a read bias signal amplitude, adjusting a channel equalization, adjusting at least one transfer function related to a read/write channel equalization, and adjusting at least one filter parameter.

9. The system of claim 7 wherein the at least one media information signal is stored on the media to be read by the read element of the tape head.

10. The system of claim 7 wherein the media is provided as part of the media cartridge and the at least one media information signal is stored in at least one of a radio frequency identification (RFID) sensor in the cartridge, and a memory in the cartridge through electrical contacts.

11. In a tape drive system for storing and retrieving information to and from a cartridge including a media, a method for optimizing write performance and read performance to and from the media, the method comprising:
   writing the media information signal to the cartridge;
   writing at least one test pattern to the media;
   reading the test pattern from the media;
   reading at least one media information signal from the cartridge; and
   adjusting at least one system parameter corresponding to at least one of the media information signal and the test pattern, wherein the media information signal corresponds to at least one of media nominal coercivity recorded on the media during manufacture, read/write error rate, error maps, magnetic coating thickness, PW50 recording characteristics, nominal data signal amplitude, total error counts, cartridge format, tape format, modulation code that is implemented for the recording and playback, recording density, and at least one frequency rolloff characteristic.

12. The method of claim 11 wherein the media information signal further corresponds to at least one of date of manufacture, and manufacturing lot numbers.

13. The method of claim 11 wherein adjusting at least one system parameter comprises at least one of adjusting signal timing, adjusting a signal pulse width, adjusting a write current signal amplitude of signals written to the media, adjusting a read bias signal amplitude, adjusting a channel equalization, adjusting at least one filter parameter, and adjusting at least one transfer function related to a read/write channel equalization.

14. The method of claim 11 wherein the at least one media information signal is stored on the media.

15. The method of claim 11 wherein the at least one media information signal is stored in at least one of a radio frequency identification (RFID) sensor in the cartridge, and a memory in the cartridge through electrical contacts.

16. The method of claim 11 further comprising updating the at least one media information signal for use in subsequent operations.

17. In a storage system for storing and retrieving information to and from a media in a media cartridge, a method for optimizing read performance from the media, the method comprising:
   reading at least one media information signal from the cartridge; and
   adjusting at least one system read parameter corresponding to the media information signal, wherein the media information signal corresponds to at least one of media nominal coercivity recorded during manufacture, read/write error rate, error maps, magnetic coating thickness, PW50 recording characteristics, nominal data signal amplitude, total error counts, cartridge format, tape format, modulation code that is implemented for the recording and playback, recording density, and at least one frequency rolloff characteristic, and wherein the media information signal further corresponds to at least one of date of manufacture and manufacturing lot numbers.

18. The method of claim 17 wherein the system is at least one of a tape drive system, a magnetic disk drive system, and an optical disk drive system.

* * * * *